(12) United States Patent
Larrain (10) Patent No.: US 7,749,633 B2
(45) Date of Patent: Jul. 6, 2010

(54) MIXING TANK FOR FUEL CELL SYSTEM

(75) Inventor: Diego Larrain, Berlin (DE)

(73) Assignee: Samsung SDI Co., Ltd., Suwon-si (KR)

( * ) Notice: Subject to any disclaimer, the term of this patent is extended or adjusted under 35 U.S.C. 154(b) by 467 days.

(21) Appl. No.: 11/679,516

(22) Filed: Feb. 27, 2007

(65) Prior Publication Data
US 2007/0202380 A1 Aug. 30, 2007

(30) Foreign Application Priority Data
Feb. 28, 2006 (EP) ................... 06110481
Jan. 23, 2007 (KR) ............. 10-2007-0007189

(51) Int. Cl.
*H01M 2/00* (2006.01)
*B65D 37/00* (2006.01)

(52) U.S. Cl. ........................ 429/34; 222/206

(58) Field of Classification Search ....................... None
See application file for complete search history.

(56) References Cited

U.S. PATENT DOCUMENTS

| | | | | |
|---|---|---|---|---|
| 6,101,988 A | * | 8/2000 | Evans | .......................... 123/41.5 |
| 7,410,714 B1 | * | 8/2008 | Burke | ............................ 429/26 |
| 2003/0095872 A1 | | 5/2003 | McNamee et al. | |
| 2003/0148166 A1 | | 8/2003 | DeJohn et al. | |
| 2004/0062964 A1 | | 4/2004 | Matsuoka et al. | |
| 2004/0131898 A1 | | 7/2004 | Zhang et al. | |
| 2004/0166389 A1 | | 8/2004 | Matsuoka et al. | |
| 2006/0024552 A1 | | 2/2006 | Fujita et al. | |
| 2007/0051740 A1 | * | 3/2007 | Huang | .......................... 220/905 |
| 2007/0160890 A1 | * | 7/2007 | Fischer | ........................ 429/34 |

FOREIGN PATENT DOCUMENTS

EP 1 383 190 A1 7/2002
EP 1 383 191 A1 7/2002

OTHER PUBLICATIONS

Search Report issued in European Patent Application No. 06110481.6 on Jul. 24, 2006.

* cited by examiner

*Primary Examiner*—Melvin C Mayes
*Assistant Examiner*—Sheng Han
(74) *Attorney, Agent, or Firm*—Stein McEwen, LLP (57) ABSTRACT

A device which can mix and store fuel and water, which is orientation independent and which has a small volume. The device includes: at least one inlet for fuel and/or water; and at least one outlet for a mixture of fuel and water, wherein the at least one inlet and the at least one outlet are connected to a flexible chamber in which fluids are mixed and temporarily stored.

20 Claims, 5 Drawing Sheets

MIXING TANK FOR FUEL CELL SYSTEM

CROSS-REFERENCE TO RELATED PATENT APPLICATIONS

This application claims the benefit of European Patent Application No. 06110481.6, filed Feb. 28, 2006, in the European Patent Office; and of Korean Patent Application No. 2007-7189, filed Jan. 23, 2007, in the Korean Intellectual Property Office, the disclosures of which are incorporated herein by reference.

BACKGROUND OF THE INVENTION

1. Field of the Invention

Aspects of the present invention relate to a device for mixing and storing fuel and water in a fuel cell system, and more particularly, to a device for mixing and storing fuel and water in a direct methanol fuel cell (DMFC) system for a portable application.

2. Description of the Related Art

A fuel cell system generally comprises a fuel cell stack, a heat exchanger, a water separator, a mixer, a carbon dioxide separator, and a tank.

In the fuel cell system, concentrated fuel and pure water are mixed into a fuel mixture. In a mixer, concentrated fuel from a fuel tank, water recovered from a heat exchanger, unreacted fuel and water from an anode are mixed and stored. Through an outlet of the mixer, the mixture of fuel and water flows to the fuel cell stack.

Figure 1:
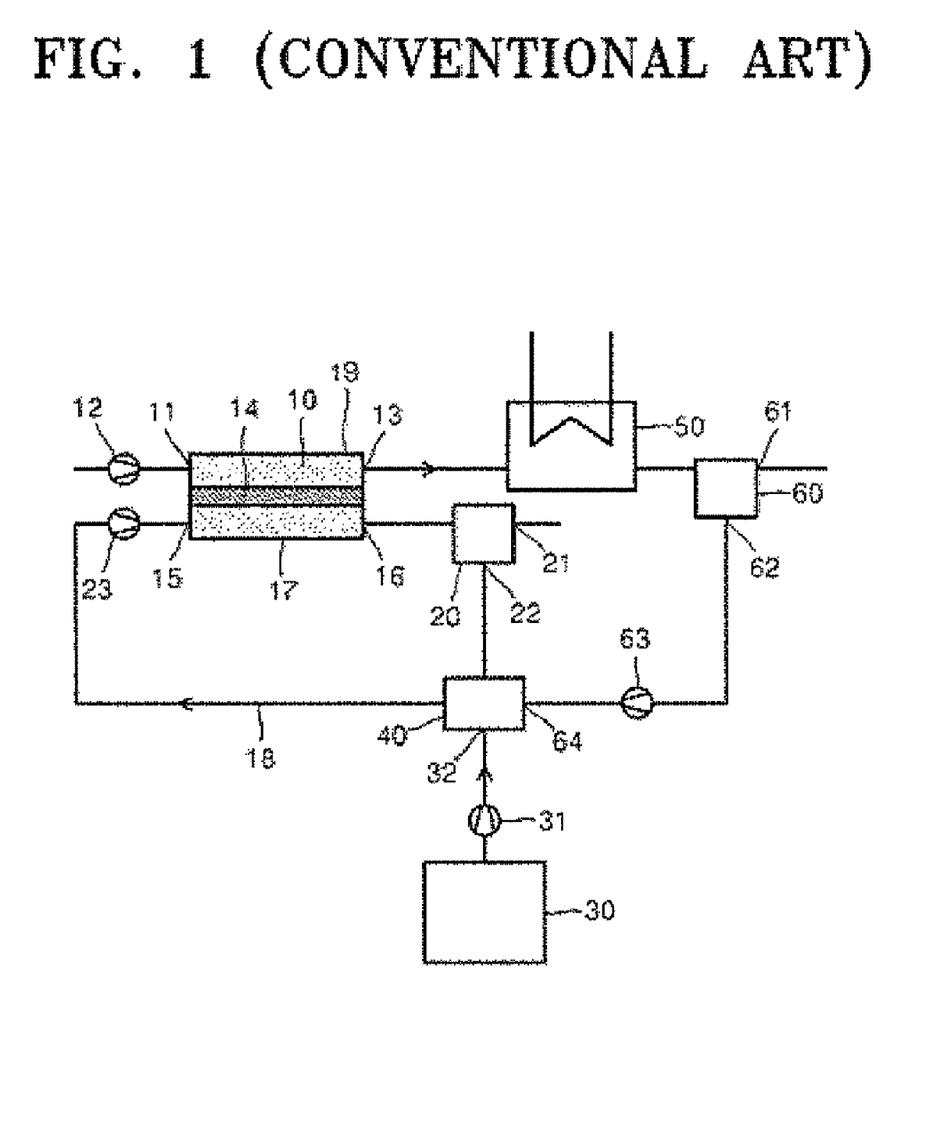
FIG. 1 is a schematic illustrating a conventional direct methanol fuel cell (DMFC) system.

A standard direct methanol fuel cell (DMFC), similar to those disclosed in Matsuoka et al. (US 2004/0166389 A1) and (US 2004/0062964 A1), is shown in FIG. 1. A DMFC stack 10 comprises a plurality of fuel cells, each fuel cell having a cathode 19 with a cathode air inlet 11 and a cathode air outlet 13; an anode 17 with an anode inlet 15 and an anode outlet 16; and a membrane 14 separating the anode 17 and the cathode 19. An air pump 12 supplies reaction air to the cathode 19 through the cathode air inlet 11. The DMFC stack 10 produces an electrochemical reaction a between a fuel stream composed of water and methanol to the anode 17 and an oxidant stream (air or oxygen) supplied to the cathode 19. The DMFC stack 10 directly produces electricity through an electrochemical reaction. The membrane 14 of the DMFC stack 10 is permeable to protons and thus the operation of the DMFC stack 10 generates a transfer of protons from the anode 17 to the cathode 19. Methanol and water enter the anode 17 of the fuel cell stack 10, and hydrogen is catalytically split from the methanol to produce carbon dioxide and free electrons. The electrons, as the membrane 14 is only permeable to protons, are conducted to the cathode 19 through an external circuit. Such flow of electrons through an external circuit creates a useable current. As the current produced by each individual fuel cell is not great enough for the needs of many applications, the individual fuel cells are arranged to form the fuel cell stack 10. At the cathode 19, the supplied oxygen, generally from air, is combined with protons that flow through the membrane 14 and the free electrons that flows through the external circuit to form water. Furthermore, the membrane 14 remains hydrated as a result of electroosmotic drag wherein the migrating protons effectively pull water molecules into the membrane 14 as the protons are transferred through the membrane 14 from the anode 17 to the cathode 19.

In order to use a concentrated fuel and minimize the volume of a fuel tank 30, the recovery of the water produced at the cathode 19 is essential to a DMFC system. A heat exchanger 50 is used to condensate the water from the cathode air outlet 13. The water is separated in a water separator 60 and is recycled through an anode circuit 18. The air exits the water separator 60 at a venting opening 61. A liquid outlet 62 of the water separator 60 is connected to the main anode circuit 18. The anode fuel circuit 18 is composed of a circulation pump 23 to feed the fuel mixture to an anode 17 through the anode inlet 15, the anode outlet 16 is connected to a carbon dioxide separator 20, and a mixer 40. The anode outlet 16 is connected to the carbon dioxide separator 20 that separates carbon dioxide generated by the fuel cell reaction from the unreacted methanol and water. The carbon dioxide may be vented to the atmosphere or captured for other uses through a carbon dioxide outlet 21. The unreacted methanol and water are recycled back to the mixer 40 through the recycle outlet 22. The mixer 40 mixes a concentrated methanol fuel from the fuel tank 30, the water recovered from the heat exchanger 50 by the water separator 60, and the recycled methanol and water from the carbon dioxide separator 20. A driving force is necessary to feed the water recovered from the heat exchanger 50 and the water separator 60, therefore the DMFC system has a pump 63 supply the water recovered from the heat exchanger 50 and the water separator 60 to the mixer 40. And, the concentrated fuel is delivered from the fuel tank 30 to the mixer 40 by a pump 31.

Figure 2:
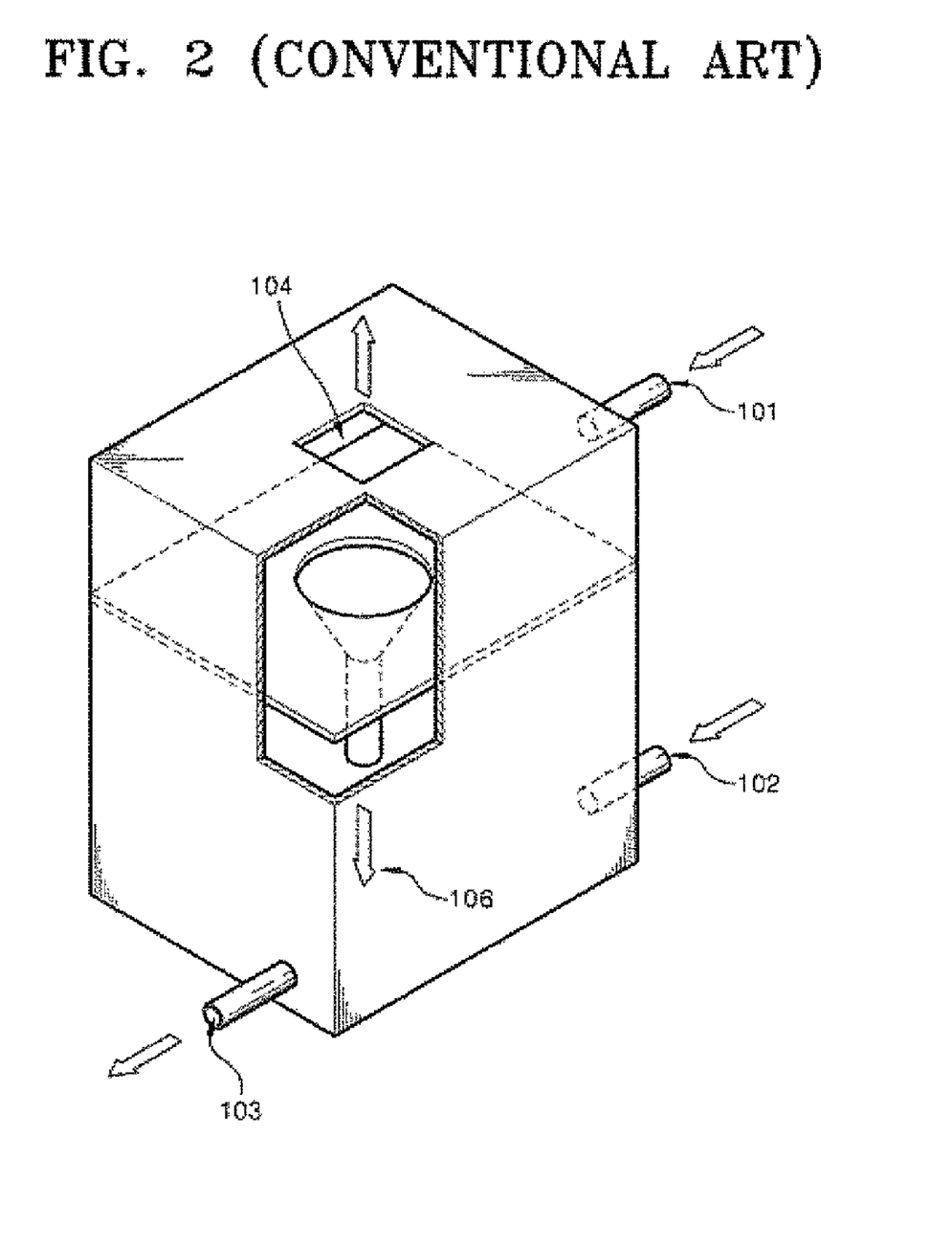
FIG. 2 is a perspective view illustrating a conventional device combining the function of a carbon dioxide separator, a water separator, a mixer, and a tank.

A device combining the function of a carbon dioxide separator, a water separator, a mixer, and a tank is described in Muller et al. (EP 1383190 A1) and (EP 1383191 A1). The principle of the device is shown in FIG. 2. A water/air inlet 101 is located on the top part of the device. The liquid water is separated by gravity 106 and falls to the bottom of the device. The fuel inlet 102 that supplies fuel to the device is located at the bottom of the device that works as a liquid hold-up tank. The gases from the incoming stream through the fuel inlet 102 exit the device through an outlet vent 104 which is a liquid-tight gas permeable membrane. A liquid mixture exits the device through an outlet 103 and flows to the fuel cell stack. The above-described device fails as both a mixer and a tank as the operation of the device is dependent on the physical orientation of the device so that the use of the device in a portable system is restricted to one position or orientation. That is, the device as disclosed by Muller et al. works only in an up-right position because it utilizes gravity to separate the liquid mixture from the gas. Thus, use of the device in a tilted or in an inverted position is either impossible or such use would require additional safety installations to protect the device against malfunction.

Additionally, the functional principle (combination of the carbon dioxide separator, the water separator, the mixer, and the tank) of the device leads to a significant volume and a large height that makes it difficult to integrate a DMFC system in a laptop docking station, battery-like system, or other small system.

SUMMARY OF THE INVENTION

Aspects of the present invention provide a device for mixing and storing fuel and water, which is orientation independent and has a small volume. Aspects of the present invention also provide a device for compensating different flow volumes between an inlet and outlet of the device in spite of having a small volume.

According to an aspect of the present invention, there is provided a device for mixing and storing fuel and water in a fuel cell system with at least one inlet to a flexible chamber for fuel and/or water and at least one outlet from the flexible chamber for a mixture of fuel and water, wherein the at least one inlet and the at least one outlet are connected to the flexible chamber in which the fluids are mixed and temporarily stored.

Water and fuel are fed through at least one inlet into the flexible chamber. In the flexible chamber, a first and second inlet can be provided. In this case, water streams through the first inlet into the flexible chamber and fuel streams through the second inlet into the flexible chamber.

It is also possible that the device is arranged downstream of a junction where a main flow (for instance, a mixture of water and fuel) and a secondary flow (for instance, fuel) are connected in such a manner that a two-component fluid consisting of fuel and water streams through the inlet into the flexible chamber.

In the flexible chamber, the two-component fluid is mixed and a mixture of the two fluids leaves the chamber through the outlet.

The volumetric flow at the inlet may be different from the volumetric flow at the outlet. Due to the flexibility of the flexible chamber, the device allows storage of a volume that varies to compensate for differences in the volumetric flow rates at the inlet and outlet. If the volumetric flow rate at the inlet becomes smaller than the volumetric flow rate at the outlet, the volume of the flexible chamber decreases to a minimum.

By contrast, if volumetric flow rate at the outlet becomes smaller than volumetric flow rate at the inlet, the volume of the flexible chamber increases.

The ratios of length, width, and height of the flexible chamber filled with fluid can vary. Due to the use of the flexible chamber, only a very small pressure is necessary to expand or to contract the mixing tank, therefore pressure levels in the fuel cell system are not influenced by the device.

The device can be used regardless of physical orientation.

Furthermore, the device is easy to produce and has low production costs.

According to another aspect of the present invention, the inlet and the outlet are parts of a tube that is arranged at least partially inside the flexible chamber, wherein at least one aperture is situated on the surface of the tube inside the chamber which allows the fluid to stream from the tube into the chamber and to stream back from the chamber into the tube. Between the tube and the flexible chamber a seal for preventing leakage is applied.

The fluids are mixed in the tube. And, at a higher volumetric flow rate at the inlet than the volumetric flow rate at the outlet, the fluids flow from the tube through the apertures into the flexible chamber. Due to the arrangement of one or more apertures, eddies are created and cause a further mixing of the fluids.

The flexible chamber may be a bag.

The flexible chamber may be made of a bendable material. Due to the bendable material, the maximum volume of the flexible chamber can be larger than the design volume of the flexible chamber if the flow volume of the inlet is higher than the flow volume of the outlet and if there is no limitation of the space surrounding the flexible chamber.

Further, the flexible chamber filled with fluid may have essentially a cuboid shape or a prismatic shape The flexible chamber may have any spatial shape.

The device can comprise bending lines in at least two walls of the flexible chamber. Thereby, a defined shape is achieved if the volume of the flexible chamber decreases.

The tube inside the flexible chamber may not be straight. As such, the ends of the tube are arranged in an angle of 90°. Alternatively, the tube inside the flexible chamber is bent into a U-shape.

The tube inside the flexible chamber may be longer than a straight tube and therefore it is possible to arrange more apertures in the tube allowing the fluids to mix and to stream from the tube into the flexible chamber and reverse.

The flexible chamber can be produced of such a material that its volume corresponds to the volume of the walls fold together when void of fluid, i.e., if a tube is arranged inside the flexible chamber, the volume of the device is nearly the same as the volume of the tube situated inside the flexible chamber.

According to another aspect of the present invention, the flexible chamber has essentially the shape of a folding bellows. The advantage of the present embodiment lies in a defined shape of the flexible chamber in a filled and in a void state as well as a large volume of the device on a small base.

The flexible chamber can be made of thin plastic material, for instance low density polyethylene (LDPE) with a low density and a thickness between 20 and 200 μm.

Furthermore, a fuel cell system can be provided, comprising a fuel cell stack, a water reservoir, a fuel tank, and a device for mixing and storing fuel and water, the device comprising: at least one inlet to a flexible chamber for fuel and/or water and at least one outlet from the flexible chamber for a mixture of fuel and water, wherein the at least one inlet and the at least one outlet are connected to the flexible chamber in which the fluids are mixed and temporarily stored.

The mixer-tank may be integrated in an anode circuit of the fuel cell system. Also, the mixing tank may be arranged upstream from a circulation pump in the fuel cell system.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
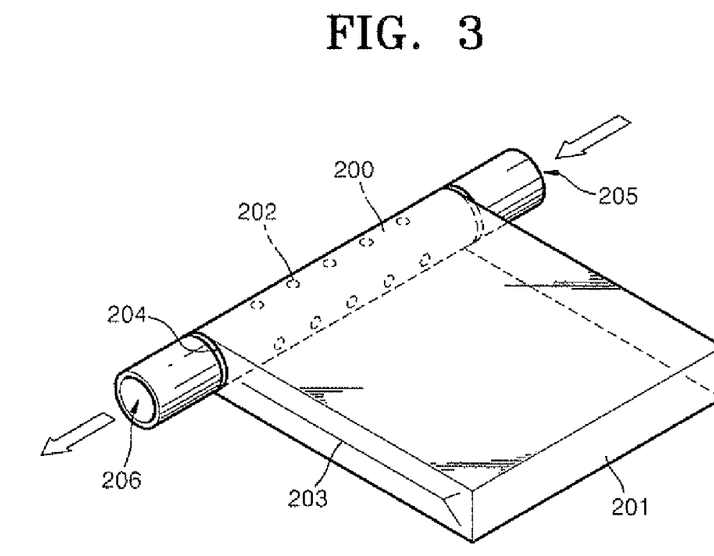
FIG. 3 is a perspective view illustrating a device in which only an inlet and an outlet are connected to a flexible chamber according to an embodiment of the present invention.

FIG. 3 is a perspective view illustrating a device in which only an inlet 205 and an outlet 206 are connected to a flexible chamber 201 according to aspects of the present invention. Fuel and water flow through the inlet 205 into the flexible chamber 201 where the fluids are mixed and stored and then flow out through the outlet 206.

The inlet 205 and the outlet 206 are connected to the flexible chamber 201. Referring to FIG. 3, a supporting tube 200 is further connected to the inlet 205 and the outlet 206 Alternatively, the inlet 205 and the outlet 206 can be parts of the supporting tube 200. The supporting tube 200 is perforated with apertures 202. On the connection of the supporting tube 200 and the flexible chamber 201, a seal 204 for preventing leakage is applied. The supporting tube 200 may be arranged about different locations of the flexible chamber 201, including in the middle of the flexible chamber 201. And, the configuration of the flexible chamber 201 is not limited to only an inlet 205 and an outlet 206 such that there may be a plurality of inlets and a plurality of outlets. On at least two walls of the flexible chamber 201, predefined bending lines 203 are arranged. The bending lines 203 allow for a predefined shape of the flexible chamber 201 in a void state (see FIG. 5). The bending lines 203 also allow for the flexible chamber 201 to be an expandable volume in that the amount of fuel and water in the flexible chamber 201 defines the volume of the flexible chamber.

Without regard for the orientation of the flexible chamber 201, the water and fuel are able to flow from the inlet 205 to the outlet 206. Also, the flow of the water and fuel is not prohibited by the amount of liquid already inside the flexible chamber 201.

Water and fuel flow through the inlet 205 into the supporting tube 200. When the volumetric flow rate at the inlet 205 is greater than the volumetric flow rate at the outlet 206, the fluids flow from the supporting tube 200 through the apertures 202 into the flexible chamber 201. Due to the arrangement of the apertures 202, eddies are created which further cause a mixing of the fluids. When the volumetric flow rate at the outlet 206 is greater than the volumetric flow rate at the inlet 205, the fluid inside the flexible chamber 201 streams through the apertures 202 back into the tube 200 and leaves the device through the outlet 206. Or another way to describe the operation of the flexible chamber 201 is in terms of relative pressures. When the pressure of the fluid flow through the supporting tube 200 is greater than the pressure in the flexible chamber 201, the water and fuel will flow into the flexible chamber 201. And, when the pressure inside the flexible chamber 201 is greater than the pressure inside the supporting tube 200, the water and fuel mixture will flow back into the supporting tube 200. When the water and fuel flow through the apertures 202, either into or out of the flexible chamber 201, the water and fuel become better mixed because of turbulence created by such flow. It is apparent that a mechanical, hydraulic, or other device may be included, internally or externally, with the flexible chamber 201 so as to control the pressure within the flexible chamber 201. Such a device may be a spring device to resist the filling of the flexible chamber 201 and favor a void or empty state of the flexible chamber 201 or an actuator that is manually or automatically controlled. Or, the flexible chamber 201 may be formed such that the flexible chamber 201 resists an internal increase in pressure. The flexible chamber may also be formed such that the resistance to an internal increase in pressure increases as the internal pressure approaches a pressure set point.

Figure 4:
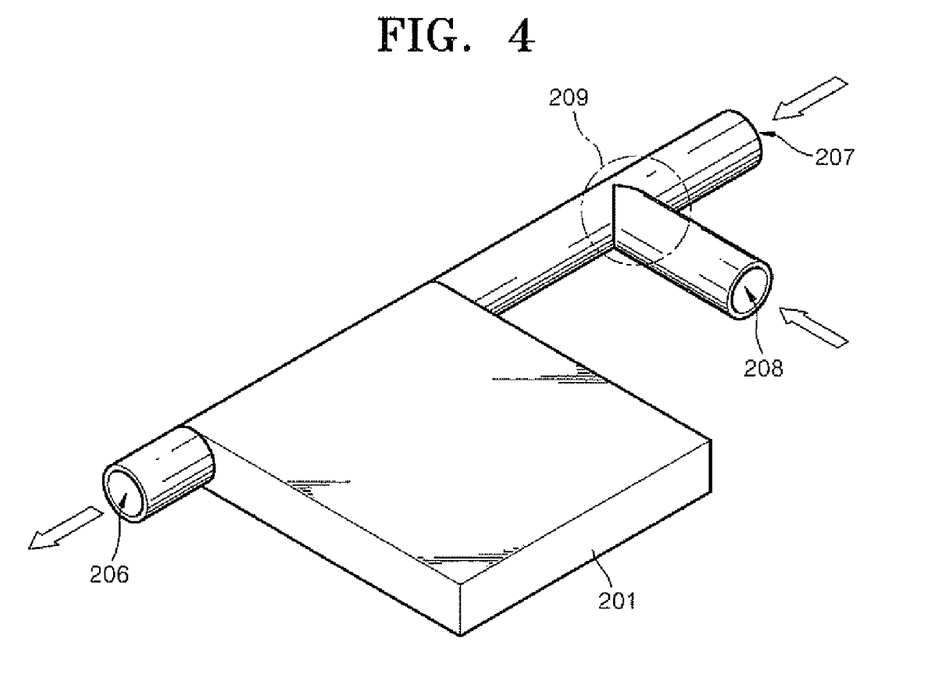
FIG. 4 is a perspective view schematically illustrating a device with a junction according to an embodiment of the present invention.

Referring to FIG. 4, the flexible chamber 201 has a cuboid shape in a filled state. A junction 209 is shown in FIG. 4. One arm of the junction 209 can be used as a water and fuel mixture inlet 207, and the other arm of the junction 209 can be used as a fuel inlet 208. The water and fuel mixture and the fuel are mixed in the supporting tube 200 (not shown). Here, water and fuel enter the water and fuel mixture inlet 207 and fuel enters the fuel inlet 208. The flow rates of the water and fuel mixture and the fuel can be modified so as to achieve the appropriate fuel concentration for the fuel cell stack. The water and fuel mixture and the fuel both enter the supporting tube 200 and mix. Depending upon the volumetric flow rates and the pressures in the inlet 205 (not shown) and the outlet 206, the mixture will flow through the apertures 202 (not shown) in the supporting tube 200 and enter or exit the flexible chamber 201. When the flexible chamber 201 is in a filled state, as depicted in FIG. 4, the flexible chamber 201 will resist an increase in pressure in the supporting tube 200.

Figure 5:
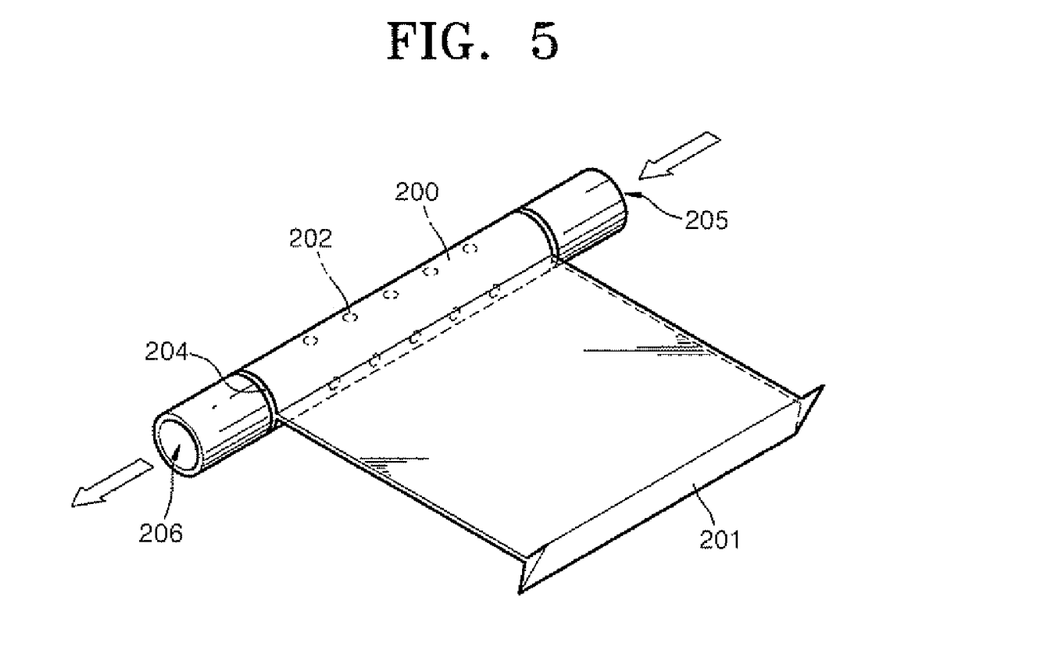
FIG. 5 is a perspective view schematically illustrating a device when no fluid is present inside according to an embodiment of the present invention.

FIG. 5 is a perspective view schematically illustrating a device in a void state according to an embodiment of the present invention. Referring to FIG. 5, the flexible chamber 201 is folded on the predefined bending lines 203 and has a nearly flat shape. The inlet 205 and the outlet 206 are connected to the supporting tube 200. And, the supporting tube 200 has apertures 202 through which the water and fuel may flow into the flexible chamber 201. The nearly flat shape of the flexible chamber 201 illustrates the expandable volume of the flexible chamber 201. When there is very little to no liquid in the flexible chamber 201, the internal volume of the flexible chamber is at a minimum. So that the flexible chamber 201 remains at the void or empty state, the pressure in the supporting tube 200 is less than the pressure in the flexible chamber 201, the volumetric flow rate at the outlet 206 is greater than the volumetric flow rate that the inlet 205, or there is a pressure regulating device associated with the flexible chamber 201 to maintain the flexible chamber 201 at a higher pressure than the pressure inside the supporting tube 201.

Figure 6:
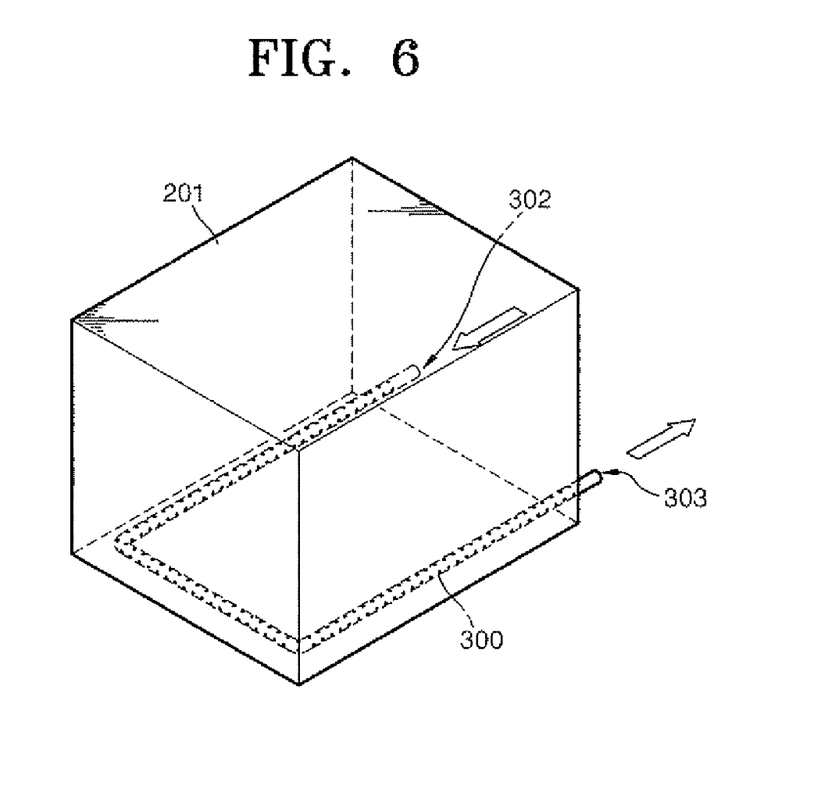
FIG. 6 is a perspective view schematically illustrating a device with a tube having a U-shape according to an embodiment of the present invention.

A tube 300 with a U-shape is shown in FIG. 6 according to an embodiment of the present invention. If the tube 300 is in a U-shape, inlet 302 and outlet 303 are arranged on the same surface of the flexible chamber 201. As the length of the tube 300 with a U-shape is increased over the tube 200 as described above, the tube 300 has an increased number of apertures.

Figure 7:
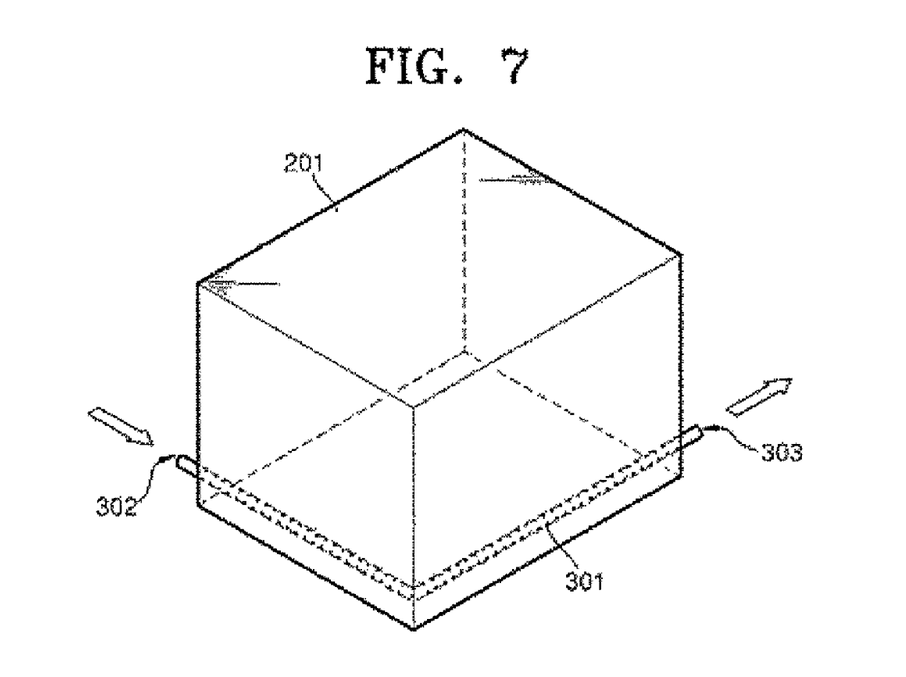
FIG. 7 is a perspective view schematically illustrating a device with a tube having a 90° bend according to an embodiment of the present invention.

Further aspects of the present invention are shown in FIG. 7 where a tube 301 is bent into an angle of 90°. If the tube 301 is bent to an angle of 90° as in FIG. 7, the inlet and the outlet 302 and 303 are arranged on adjacent surfaces of the flexible chamber 201. The same principles apply to both of the flexible chambers 201 of FIGS. 6 and 7 wherein the pressures and fill levels inside the flexible chambers 201 are dependent upon the pressures and volumetric flow rates associated with the tubes 300 and 301, respectively. If the volumetric flow rates through the outlets 303 are greater than the volumetric flow rates through the inlets 302, then the water and fuel mixture will flow from the flexible chambers 201 through the apertures in the tubes 300 and 301 and to the outlets 303. In such a system, the greater volumetric flow rates of the outlets 303 would lead to lower pressures in the tubes 300 and 301 and result in the flow from the flexible chambers 201 to the tubes 300 and 301 and the outlets 303. Although FIGS. 6 and 7 illustrate the tubes 300 and 301 in a U-shape and bent at 90°, the tubes 300 and 301 may form any other shape to allow the flexible chamber 201 to accept, mix, and dispense the water and fuel mixture depending on the flow rates of the outlets 303 and the pressures in the flexible chambers 201 and the tubes 300 and 301.

Figure 8:
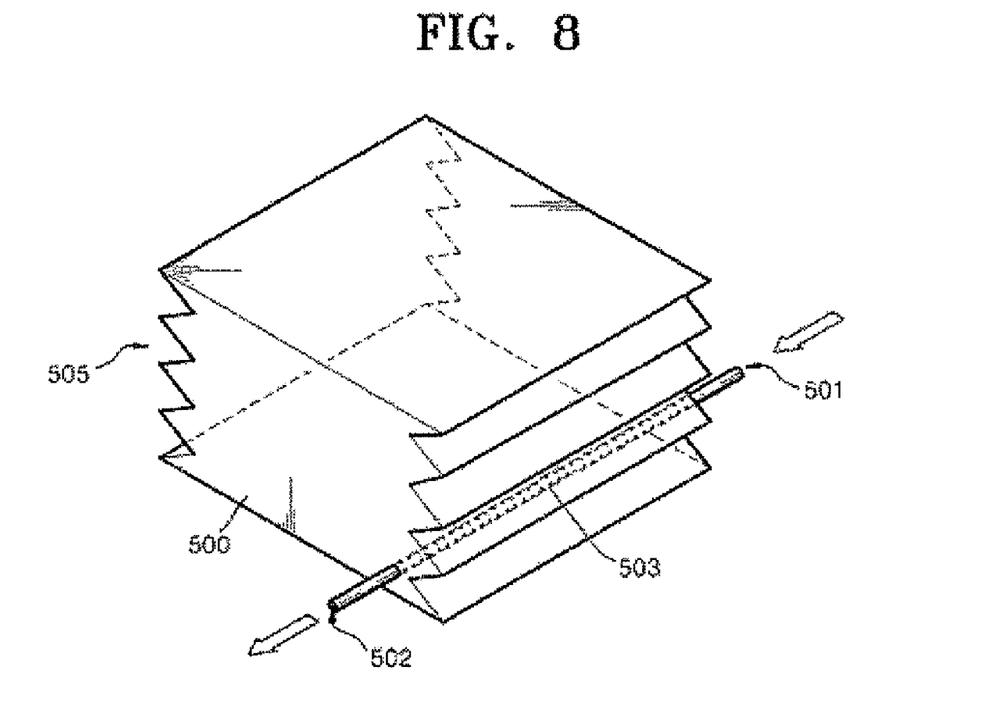
FIG. 8 is a perspective view schematically illustrating a device having a folding bellows as a flexible chamber according to an embodiment of the present invention.

FIG. 8 is a perspective view illustrating a flexible chamber 500 having folding pleats 505 according to an embodiment of the present invention. Generally, the flexible chamber 500 is a bellows, or a flexible and expansible vessel. The pleats 505 as shown are disposed on two sides of the flexible chamber 500 but are not limited thereto. The pleats may be disposed about the entire periphery of the flexible chamber 500 or in only portions of the periphery of the flexible chamber 500. Furthermore, the pleats 505 act to allow the flexible chamber 500 to expand and contract in response to pressure or flow rate differentials in the inlet 501 and the outlet 502. Referring to FIG. 8, it is obvious that the shape of the flexible chamber 500 does not need to be cuboid. However, the flexible chamber 500 can have the shape of a cylinder, a prismatic shape, or generally any other shape. Similar to above, the flexible chamber 500 contains an inlet 501 and an outlet 502. The water and fuel mixture flows into the tube 503, which contains at least an aperture disposed to fluidly connect the tube 503 to the flexible chamber. The inlet 501 and the outlet 502 may be located on the same side, adjacent sides, or opposite sides of the flexible chamber 500. If the flexible chamber 500 is not cuboidal, then the inlet 501 and the outlet 502 may be located such that the flexible chamber 500 may accept and mix the water and fuel mixture and dispense the water and fuel mixture when necessary or desired.

According to aspects of the present invention, a device can mix and store fuel and water and be orientation independent and have a small volume.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel cell system comprising:
a fuel cell stack and a device for mixing and storing fuel and water in the fuel cell system, the device comprising at least one inlet for fuel and/or water; at least one outlet for a mixture of the fuel and the water; and a flexible chamber, wherein the at least one inlet and the at least one outlet are connected to the flexible chamber in which fluids are mixed and temporarily stored, wherein the at least one inlet and the at least one outlet are connected via a tube which is arranged at least partially inside the flexible chamber, wherein at least one aperture is formed through the surface of the tube inside the chamber which allows the fuel and/or water to flow from the tube into the chamber and to flow back from the chamber into the tube.

2. The device of claim 1, wherein the flexible chamber consists of a bag.

3. The device of claim 1, wherein the flexible chamber is made of a bendable material.

4. The device of claim 1, wherein bending lines are provided on at least two walls of the flexible chamber.

5. The device of claim 1, wherein the volume on the inside of the flexible chamber when not filled with fluid is essentially the same as the volume of the tube inside the flexible chamber.

6. The device of claim 1, wherein the flexible chamber has folding pleats.

7. A fuel cell system, comprising:
a fuel cell stack;
a water reservoir;
a fuel tank; and
a device to mix and store fuel and water, comprising:
at least one inlet for fuel from the fuel tank and/or water from the water reservoir, and
at least one outlet for a mixture of fuel and water connected to the fuel cell stack, wherein the at least one inlet and the at least one outlet are connected to a flexible chamber in which fluids are mixed and temporarily stored,
wherein the at least one inlet and the at least one outlet are connected via a tube which is arranged at least partially inside the flexible chamber, wherein at least one aperture is formed through the surface of the tube inside the chamber which allows the fuel and/or water to flow from the tube into the chamber and to flow back from the chamber into the tube.

8. A fuel cell system comprising:
at least a fuel cell,
a mixing tank, the mixing tank comprising a chamber with an expandable volume; an inlet to the chamber; and an outlet from the chamber; and a tube to connect the inlet and the outlet, the tube containing apertures through which the liquid is flowable from the inside of the tube to the expandable volume of the chamber and from the expandable volume of the chamber to the inside of the tube, wherein a liquid is flowable from the inlet to the outlet, and the expandable volume increases or decreases in response to the liquid flowing into the chamber and out of the chamber.

9. The mixing tank of claim 8, wherein the expandable volume increases or decreases in response to a difference between volumetric flow rates at the inlet and the outlet.

10. The mixing tank of claim 8, wherein the expandable volume increases or decreases in response to a pressure difference between the expandable volume and the tube.

11. The mixing tank of claim 8, wherein the apertures increase the mixing of the liquid by creating turbulence in the tube and the expandable volume.

12. The mixing tank of claim 8, wherein the chamber further comprises bending lines.

13. The mixing tank of claim 8, wherein the chamber further comprises pleats.

14. The mixing tank of claim 8, wherein the chamber is a bellows.

15. The mixing tank of claim 8, further comprising a pressure controller to manually or automatically control the pressure inside the chamber.

16. The mixing tank of claim 8, further comprising a plurality of inlets to the chamber and a plurality of outlets from the chamber.

17. The mixing tank of claim 8, wherein the expandable volume is at a minimum when there is no liquid inside the chamber.

18. The mixing tank of claim 8, wherein a liquid is flowable from the inlet to the outlet regardless of the orientation of the mixing tank.

19. A fuel cell system comprising:
at least a fuel cell and
a chamber, the chamber comprising, an expandable volume, an inlet to the chamber, an outlet from the chamber, and a tube to connect the inlet and the outlet, wherein the tube contains apertures through which the liquid is flowable from the inside of the tube to the expandable volume of the chamber and from the expandable volume of the chamber to the inside of the tube, wherein, regardless of the orientation of the fuel cell system, a liquid is flowable from the inlet to the chamber to the outlet from the chamber, and the expandable volume increases or decreases in response to the liquid flowing into the chamber and out of the chamber.

20. The fuel cell system of claim 19, further comprising:
a pressure controller to manually or automatically control the pressure of the chamber.

* * * * *

UNITED STATES PATENT AND TRADEMARK OFFICE
CERTIFICATE OF CORRECTION

PATENT NO. : 7,749,633 B2  Page 1 of 1
APPLICATION NO. : 11/679516
DATED : July 6, 2010
INVENTOR(S) : Diego Larrain It is certified that error appears in the above-identified patent and that said Letters Patent is hereby corrected as shown below:

On the Title Page

Item (30) Foreign       Delete "06110481"
Application Priority    Insert -- 06110481.6 --
Date, Line 1

Signed and Sealed this
Eighth Day of November, 2011

David J. Kappos
*Director of the United States Patent and Trademark Office*